(12) United States Patent
Yokota et al.

(10) Patent No.: US 11,586,191 B2
(45) Date of Patent: Feb. 21, 2023

(54) DEVICE MAINTENANCE APPARATUS, DEVICE MAINTENANCE METHOD, AND NON-TRANSITORY COMPUTER READABLE STORAGE MEDIUM

(71) Applicant: YOKOGAWA ELECTRIC CORPORATION, Tokyo (JP)

(72) Inventors: Yusuke Yokota, Tokyo (JP); Ryouhei Furihata, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 459 days.

(21) Appl. No.: 16/420,591

(22) Filed: May 23, 2019

(65) Prior Publication Data

US 2019/0369611 A1 Dec. 5, 2019

(30) Foreign Application Priority Data

May 30, 2018 (JP) .............................. JP2018-103463

(51) Int. Cl.
*G05B 23/02* (2006.01)
*G05B 19/042* (2006.01)
*G06F 11/263* (2006.01)
*G06F 11/273* (2006.01)

(52) U.S. Cl.
CPC ..... *G05B 23/0256* (2013.01); *G05B 19/0428* (2013.01); *G06F 11/263* (2013.01); *G06F 11/2733* (2013.01); *G05B 2219/2639* (2013.01)

(58) Field of Classification Search
CPC ............ G05B 23/0256; G05B 19/0428; G05B 2219/2639; G05B 23/0216; G05B 23/0213; G06F 11/2733; G06F 11/263
See application file for complete search history.

(56) References Cited

U.S. PATENT DOCUMENTS

| | | | |
|---|---|---|---|
| 2002/0121913 A1* | 9/2002 | Miller ................ | G01R 31/2874 324/750.05 |
| 2003/0182075 A1 | 9/2003 | Sutton et al. | |
| 2005/0237230 A1* | 10/2005 | Bejean ................ | H01H 9/0235 341/24 |

(Continued)

FOREIGN PATENT DOCUMENTS

| | | |
|---|---|---|
| JP | 6041143 A | 3/1985 |
| JP | 2001-208885 A | 8/2001 |

(Continued)

OTHER PUBLICATIONS

"Versatile Device Management Wizard FieldMate R3.02", New Products, Yokogawa Technical Report, 2016, 2 pgs., vol. 59, No. 2.

*Primary Examiner* — Alexander Satanovsky
(74) *Attorney, Agent, or Firm* — Sughrue Mion, PLLC

(57) ABSTRACT

A device maintenance apparatus includes a test executor configured to cause a device to output an output signal based on a test pattern that changes the output signal output from the device with an elapse of time, and a change instructor configured to issue a change instruction for changing at least one of a progress of an output of the output signal based on the test pattern and an output value of the output signal to the test executor in accordance with an instruction input while the test executor causes the device to execute the output of the output signal.

13 Claims, 6 Drawing Sheets

(56) References Cited

U.S. PATENT DOCUMENTS

| | | | | |
|---|---|---|---|---|
| 2008/0236679 | A1* | 10/2008 | Esposito | G05D 7/0629 |
| | | | | 137/487.5 |
| 2013/0049794 | A1* | 2/2013 | Humphrey | G01R 31/40 |
| | | | | 324/764.01 |
| 2013/0290796 | A1* | 10/2013 | Toyoda | G01R 31/318307 |
| | | | | 714/715 |
| 2014/0095931 | A1* | 4/2014 | Sadasivam | G06F 11/3688 |
| | | | | 714/28 |
| 2017/0293544 | A1 | 10/2017 | Katayama et al. | |

FOREIGN PATENT DOCUMENTS

| | | |
|---|---|---|
| JP | 2005-25631 A | 1/2005 |
| JP | 2005259022 A | 9/2005 |
| JP | 2011-107455 A | 6/2011 |
| JP | 2014-500986 A | 1/2014 |
| JP | 2017-191386 A | 10/2017 |
| WO | 2012/016003 A2 | 2/2012 |

\* cited by examiner

DEVICE MAINTENANCE APPARATUS, DEVICE MAINTENANCE METHOD, AND NON-TRANSITORY COMPUTER READABLE STORAGE MEDIUM

BACKGROUND

Technical Fields

The present invention relates to a device maintenance apparatus, a device maintenance method, a device maintenance program, and a non-transitory computer readable storage medium.

Priority is claimed on Japanese Patent Application No. 2018-103463, filed May 30, 2018, the contents of which are incorporated herein by reference.

Related Art

Conventionally, in plants, factories and the like (hereinafter, which are collectively referred to as a "plant") such as industrial plants such as chemical plants, plants for managing and controlling well sites, such as gas fields and oil fields, and surroundings thereof, plants for managing and controlling power generation such as hydroelectric power generation, thermal power generation and nuclear power generation, plants for managing and controlling energy harvesting such as sunlight and wind power, and plants for managing and controlling water supply and sewerage, dams and the like, a distributed control system (DCS) in which a field device such as a measuring device or an operating device is connected to a control device for controlling the device through a communication means has been constructed and advanced automatic operations have been realized. In a plant in which such a distributed control system has been constructed, maintenance of a field device (hereinafter which may be abbreviated as a "device") is performed by an operator on a regular or occasional basis from the viewpoint of prevention of abnormal operations, and maintenance of measurement accuracy.

Maintenance of a field device is performed using a device maintenance apparatus that can perform wired communication or wireless communication with the field device. For example, this device maintenance apparatus is a laptop or tablet computer, a personal digital assistance (PDA), a smartphone or the like in which a dedicated program for performing field device maintenance has been installed. Maintenance items for field devices include various maintenance operations depending on field devices that are maintenance targets, such as an operation of reading and confirming device information set in a field device that is a maintenance target and an operation of setting new device information in a field device that is a maintenance target, for example.

A device maintenance apparatus is connected to field devices through wired communication or wireless communication and displays a list of the connected field devices on a display screen (refer to Japanese Unexamined Patent Application Publication No. 2017-191386, for example). An operator who performs maintenance performs a maintenance operation according to a maintenance item by appropriately switching display screens of the device maintenance apparatus, such as a screen for selecting one field device from the displayed field device list, a screen for selecting a category of maintenance items with respect to the selected field device, a screen for selecting a maintenance item from the selected category, a screen for setting the selected maintenance item, a screen for executing the set maintenance item, a screen for inputting results of the executed maintenance item, and a screen for outputting execution results of the maintenance item.

In addition, maintenance items include various tests using field devices. Tests using field devices include a test of outputting a simulation signal to a field device. This test causes a field device to generate a simulation signal according to a test pattern formed in advance.

However, a maintenance operation performed in plants and facilities has been generally determined for each plant or facility. Accordingly, a test pattern used in the aforementioned test for outputting a simulation signal to a field device is substantially fixed for a plant or a facility. Safe and efficient operations are realized by saving such a substantially fixed test pattern in a device maintenance apparatus and reusing the test pattern. However, a conventional method only outputs a simulation signal according to a test pattern from the beginning to the end of the test pattern, and when it is necessary to change the simulation signal to be generated in the middle of the test, countermeasures suited to the occasion cannot be performed. Accordingly, it is difficult to improve the efficiency of a maintenance operation.

SUMMARY

One aspect of the present invention is a device maintenance apparatus which may include a test executor configured to cause a device to output an output signal based on a test pattern that changes the output signal output from the device with an elapse of time; and a change instructor configured to issue a change instruction for changing at least one of a progress of an output of the output signal based on the test pattern and an output value of the output signal to the test executor in accordance with an instruction input while the test executor causes the device to execute the output of the output signal.

Further features and aspects of the present disclosure will become apparent from the following detailed description of exemplary embodiments with reference to the attached drawings.

DETAILED DESCRIPTION OF THE EMBODIMENTS

Figure 1:
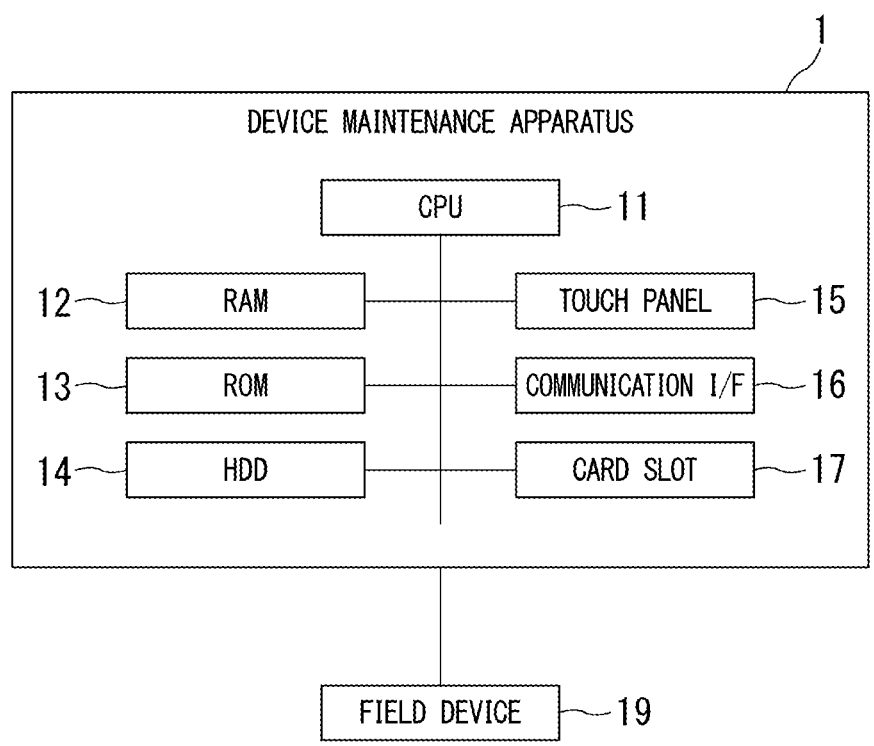
FIG. 1 is a block diagram showing an example of a hardware configuration of a device maintenance apparatus in an embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a device maintenance apparatus, a device maintenance method, a device maintenance program, and a non-transitory computer readable storage medium which can improve operation efficiency of a maintenance operation.

Hereinafter, an embodiment of the present invention will be described with reference to the drawings. In the following, the overview of the present invention will be described first and then each embodiment will be described in detail.

[Overview]

A device maintenance apparatus in an embodiment of the present invention promotes improvement of the operation efficiency of a maintenance operation. Specifically, the device maintenance apparatus promotes improvement of the operation efficiency of a maintenance operation by solving some or all of the following problems.

A test pattern in a conventional technique is composed of an output level (output value) of a simulation signal (output signal) of a field device, an interval time, and a score of the simulation signal. Although a field device outputs a simulation signal according to such a test pattern, a countermeasure suited to the occasion cannot be performed in an operation. More specifically, the conventional technique has the following problems.

[Problem 1]

Since a time (hereinafter referred to as an "interval time") at which a simulation signal at a predetermined output level is output is fixed to a value set in advance for each output level, a field device must wait a predetermined time even when the field device has output a simulation signal at a certain output level and a signal reception device or the like has rapidly checked the simulation signal.

[Problem 2]

When there is an output level which has not been able to be checked within an interval time, the process needs to be resumed from the beginning of a test pattern in order to check the output level and it is necessary to wait during output of a checked output level because an output level of a simulation signal output from a field device changes according to the test pattern. Accordingly, a test time is required when there is an output level which has not been able to be checked.

[Problem 3]

In a case in which data checking may not be performed within an interval time set in a test pattern depending on a signal path of a simulation signal or an application configuration (for example, when a plurality of devices are interposed between a field device and a signal reception device), it is not possible to cope with such a case.

In addition, an operator needs to reset a test pattern in consideration of an interval time within which data checking can be performed and perform a test again.

[Problem 4]

When it is necessary to output an output level different from an output level of a simulation signal set in a test pattern according to situations of a plant, a facility and a field device, it is not possible to cope with this through a test according to the test pattern.

[Problem 5]

When tests are performed using an insignificant simulation signal (output level or interval time) difference, individual test patterns therefor need to be prepared. Further, when an operator who is unaccustomed to a test performs a maintenance operation in the field, the operator may have trouble determining which one of a plurality of prepared test patterns will be used for a field device that is a test target. Accordingly, a correct test cannot be performed when a test is performed using a wrong test pattern.

The device maintenance apparatus in an embodiment of the present invention promotes improvement of the operation efficiency of a maintenance operation by inputting a change instruction for changing at least one of the progress of output of a simulation signal based on a test pattern and an output level of the simulation signal and causing a field device to perform an operation according to the input change instruction.

Embodiment

FIG. 1 is a block diagram showing an example of a hardware configuration of a device maintenance apparatus 1 in an embodiment.

In FIG. 1, the device maintenance apparatus 1 includes a central processing unit (CPU) 11, a random access memory (RAM) 12, a read only memory (ROM) 13, a hard disk drive (HDD) 14, a touch panel 15, a communication interface (I/F) 16, and a card slot 17. The device maintenance apparatus 1 is connected to a field device 19 such that the device maintenance apparatus 1 can communicate with the field device 19.

The device maintenance apparatus 1 is a general-purpose device such as a laptop PC, a tablet PC, a PDA or a smartphone, or a device dedicated for device maintenance. The device maintenance apparatus 1 includes a device maintenance program for performing maintenance of field devices and supports a field device maintenance operation when the device maintenance program is executed. The device maintenance apparatus 1 is carried by an operator who performs a maintenance operation in a plant and operated by the operator.

In addition, the device maintenance apparatus 1 causes the field device 19 to execute a loop test as device maintenance. The loop test is a test for checking an operation of the field device 19 and whether the field device 19 is correctly coupled to a higher device or the like by causing the field device 19 to output a simulation signal at a predetermined output level (test output level) to the higher device or the like such as a DCS in a control system such as a plant.

The CPU 11 controls the device maintenance apparatus 1 by executing a program stored in the RAM 12, the ROM 13 or the HDD 14. For example, the device maintenance program may be acquired from a storage medium in which the device maintenance program has been recorded or a server or the like which provides the device maintenance program through a network, installed in the HDD 14 and stored in the RAM 12 such that it can be read by the CPU 11.

The touch panel 15 is a display which has an operation display function including an operation input function and a display function. The touch panel 15 displays a maintenance list that is a list of operation targets including maintenance information pertaining to maintenance of field devices and maintenance items with respect to devices that are maintenance targets. In addition, the touch panel 15 enables an operator to input an operation using a fingertip, a stylus or the like. Although a case in which the device maintenance apparatus 1 in the present embodiment uses the touch panel 15 having an operation display function is described, the device maintenance apparatus 1 may be a device including a display device having a display function and an operation input device having an operation input function. In such a case, the present embodiment can implement a display screen of the touch panel 15 as a display screen of the display device and implement an operation of the touch panel 15 as an operation of the operation input device. Meanwhile, the touch panel 15 may be realized as various types such as head mount type, glasses type, and wrist-watch type displays.

For example, the communication I/F 16 may be a network adaptor which controls communication with the field device 19 or other devices through wired communication or wireless communication. Other devices may include other device maintenance apparatus, a maintenance information management server which manages maintenance information, a distributed control system (DCS) control device, a factory automation (FA) computer, a programmable logic controller (PLC) and the like, which are not shown, for example.

The communication I/F 16 controls communication with the field device 19 using a communication protocol which can be used in the field device 19. Various communication protocols are used in various field devices 19 used in a plant. Accordingly, the communication I/F 16 controls communication with a field device 19 in a communication protocol corresponding to each field device 19. For example, the communication I/F 16 controls communication with field devices 19 using ISA100 which is a wireless communication standard of the International Society of Automation (ISA). Further, the communication I/F 16 may control communication with field devices 19 using communication protocols dedicated for industrial devices, such as Highway Addressable Remote Transducer (HART) (registered trademark), BRAIN (registered trademark), FOUNDATION Fieldbus and PROFIBUS. In addition, the communication I/F 16 may control communication with field devices 19, DCSs and the like which use general-purpose communication protocols such as wireless LAN communication, wired LAN communication, infrared communication and near field wireless communication.

The card slot 17 is a slot into which a PC card is inserted. The card slot 17 allows functions of a PC card inserted thereinto to be able to be used in the device maintenance apparatus 1. A PC card can provide a communication function for realizing specific communication and a storage function, for example.

The field device 19 connected to the device maintenance apparatus 1 such that it can communicate with the device maintenance apparatus 1 is an input device through which a signal of a physical quantity (pressure, temperature or the like) is input to the device maintenance apparatus 1, such as a differential pressure gauge, a thermometer, a flowmeter, or the like, or an output device for which a control signal for changing an opening of a control valve is output from the device maintenance apparatus 1, such as a control value. Although field devices 19 are omitted and only one is illustrated in FIG. 1, various field devices 19 are used in a plant and the device maintenance apparatus 1 is connected to a plurality of field devices 19, as described above.

The hardware configuration of the device maintenance apparatus 1 has been described above using FIG. 1.

Figure 2:
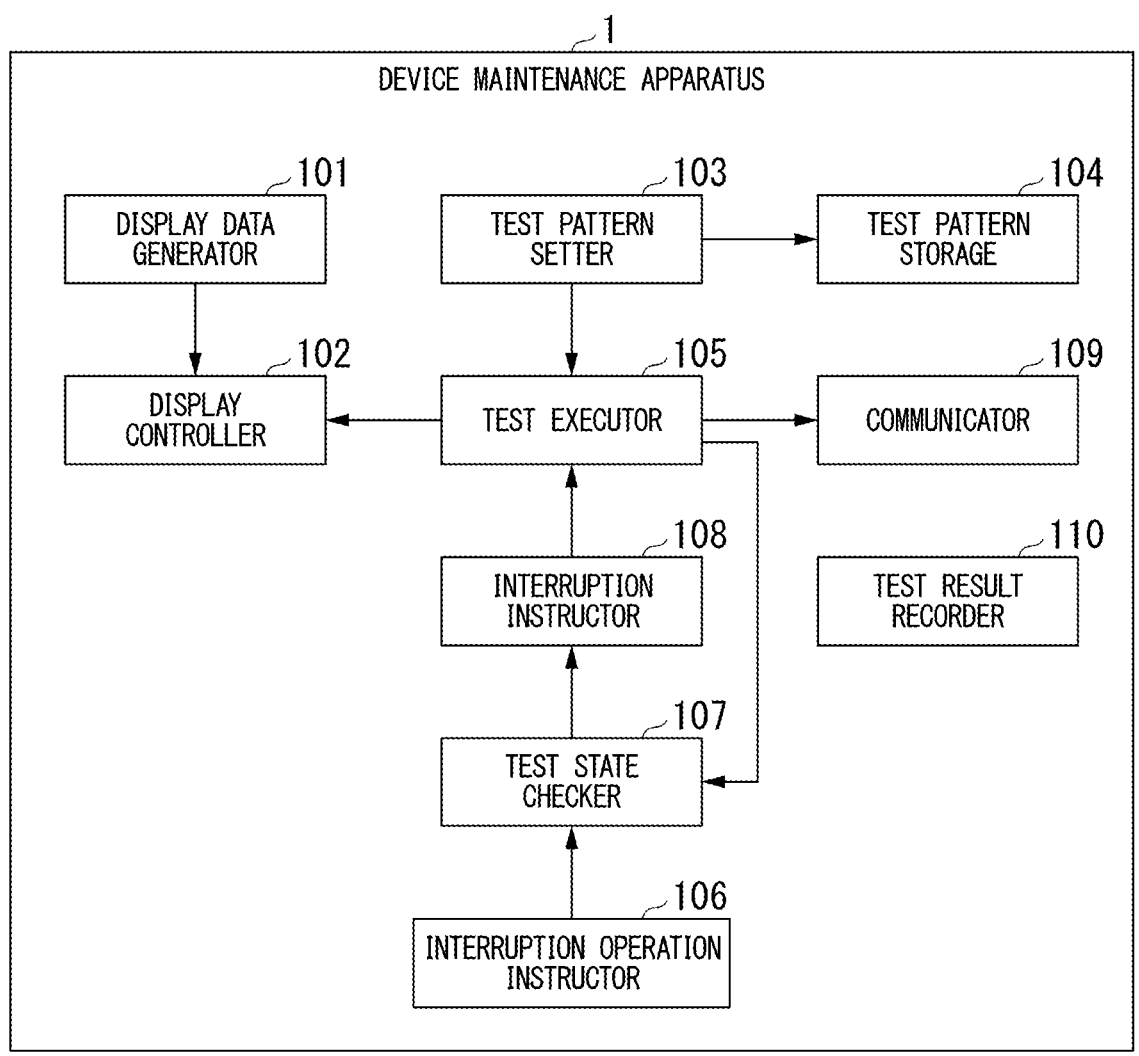
FIG. 2 is a block diagram showing an example of a functional configuration of the device maintenance apparatus in an embodiment.

FIG. 2 is a block diagram showing an example of a functional configuration of the device maintenance apparatus 1 in an embodiment. Meanwhile, the following description appropriately refers to FIG. 1.

The device maintenance apparatus 1 has functions of a display data generator 101, a display controller 102, a test pattern setter 103, a test pattern storage 104, a test executor 105, an interruption operation instructor 106, a test state checker 107, an interruption instructor 108, a communicator 109 and a test result recorder 110. Each function of the device maintenance apparatus 1 can be realized by executing a program in the CPU 11 shown in FIG. 1. That is, each function of the device maintenance apparatus 1 is a functional module realized by software.

The display data generator 101 generates display data to be displayed on the touch panel 15. Specifically, the display data generator 101 generates display data of a setting screen for setting a test pattern for changing a simulation signal output from the field device 19 with the elapse of time. Further, the display data generator 101 generates display data of an execution screen for executing a loop test. A test pattern may include information such as the number of repetitions in addition to an interval time and an output level of a simulation signal.

The display controller 102 controls display of the touch panel 15 on the basis of display data generated by the display data generator 101. Specifically, the display controller 102 displays display data through the touch panel 15. In addition, when an operation instruction is input through the touch panel 15, the display controller 102 controls display of the touch panel 15 according to the input operation instruction. For example, when an instruction for switching display screens of the touch panel 15 is input through the touch panel 15, the display controller 102 switches display screens of the touch panel 15.

The test pattern setter 103 sets a test pattern input through the setting screen. The test pattern setter 103 outputs the set test pattern to the test pattern storage 104 or the test executor 105.

The test pattern storage 104 stores the test pattern output from the test pattern setter 103. For example, the test pattern storage 104 may store the test pattern in the HDD 14.

The test executor 105 causes the field device 19 to output a simulation signal based on a test pattern by transmitting a simulation signal output instruction to the field device 19 through the communicator 109. Specifically, when a loop test execution instruction is issued, the test executor 105 causes the field device 19 to output a simulation signal at an output level set through a test pattern during an interval time set through the test pattern according to the test pattern set through the test pattern setter 103 or a test pattern stored in the HDD 14. The output instruction includes information on an output level of a simulation signal caused to be output from the field device 19. The text execution part 105 outputs a test pattern which is being currently executed to the test state checker 107.

In addition, the test executor 105 performs an operation according to an interruption instruction output from the interruption instructor 108. The interruption instruction is an instruction for stopping a process which is being performed and forcibly performing a designated process. The interruption instruction includes an instruction for changing at least one of the progress of output of a simulation signal based on a test pattern and an output level of the simulation signal.

When an interruption operation is performed, the interruption operation instructor 106 generates an interruption signal representing that the interruption operation has been performed. The interruption operation instructor 106 outputs the generated interruption signal to the test state checker 107. The interruption signal includes information representing what kind of interruption operation has been performed.

The test state checker 107 determines whether an interruption operation is possible according to an execution state of a loop test when an interruption signal is input from the interruption operation instructor 106. When the interruption operation is possible, the test state checker 107 outputs an interruption signal to the interruption instructor 108. Further, when the interruption operation is not possible, the test state checker 107 stores the interruption signal until the interruption operation becomes possible and outputs the interruption signal to the interruption instructor 108 when the interruption operation becomes possible.

The interruption instructor 108 outputs an interruption instruction according to the interruption signal output from the test state checker 107 to the test executor 105 according to an instruction input while the test executor 105 causes the field device 19 to output an output signal. The interruption instructor 108 is one aspect of a change instructor. In addition, the interruption instruction is one aspect of a change instruction for changing operations to be performed in the text execution part 105.

The interruption instructor 108 can rapidly change operations to be performed in the test executor 105 by using the interruption instruction. Meanwhile, when an inquiry about presence or absence of an instruction for changing the progress of output, an output level, and the like is regularly received from the test executor 105 even when the test executor 105 is not instructed according to interruption, the interruption instructor 108 may transmit (return) the change instruction to the test executor 105.

The communicator 109 controls communication with the field device 19 or communication with other devices through the communication I/F 16 and transmits a simulation signal output instruction from the test executor 105 to the field device 19. Setting, reading, checking and the like of parameters (device information) of the field device 19 according to a standard such as ISA100, HART or BRAIN, for example, are performed through communication controlled by the communicator 109. The communicator 109 may control wireless LAN communication, wired LAN communication, infrared communication, near field communication, and the like.

The communicator 109 may have a program module for performing control corresponding to each communication. The communicator 109 may be configured to be able to add a program module necessary for each communication and install the program module. The communicator 109 can automatically recognize the field device 19 connected through the communication I/F 16 and acquire parameters of the recognized field device 19.

The test result recorder 110 records results of a loop test executed by the test executor 105 in the HDD 14. For example, the test result recorder 110 records results of a loop test executed according to a test pattern and results of a loop test executed according to an interruption instruction in the HDD 14 in a time series. Results of a loop test include an output level of a simulation signal, an interval time, details of an interruption instruction, and the like. In addition, the test result recorder part 110 may associate details of an output instruction transmitted from the communicator 109 to the field device 19 with time information (for example, information about a date and time when the communicator 109 communicates with the field device 19) and record the associated information.

Meanwhile, a case in which the functions of the display data generator 101, the display controller 102, the test pattern setter 103, the test pattern storage 104, the test executor 105, the interruption operation instructor 106, the test state checker 107, the interruption instructor 108, the communicator 109 and the test result recorder 110 included in the device maintenance apparatus 1 are realized by software has been described in FIG. 2. However, one or more functions included in the device maintenance apparatus 1 may be realized by hardware. In addition, with respect to the aforementioned functions included in the device maintenance apparatus 1, one function may be divided into a plurality of functions and implemented. Further, with respect to the aforementioned functions included in the device maintenance apparatus 1, two or more functions may be integrated into one function and implemented.

Figure 3:
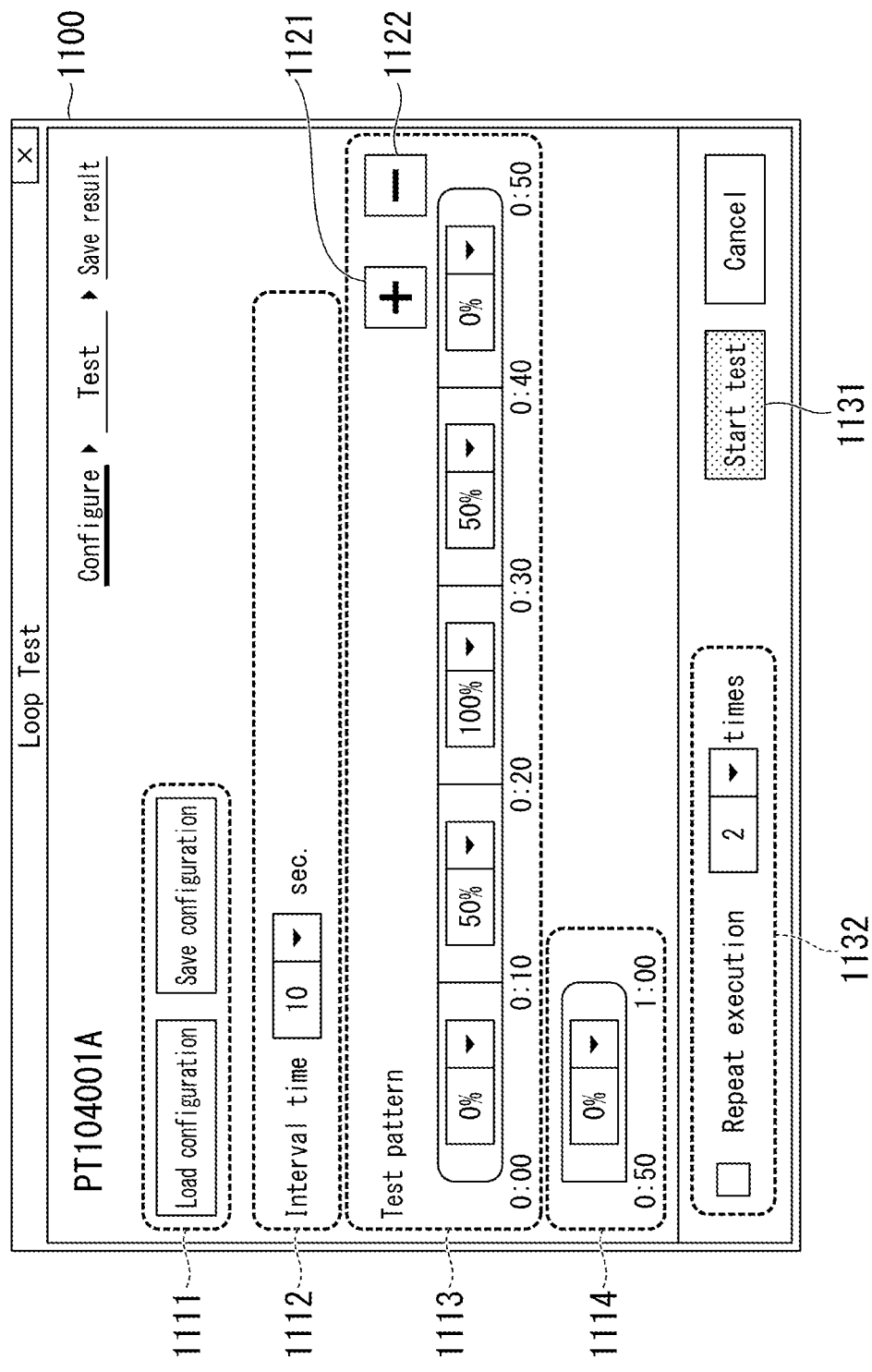
FIG. 3 is a diagram showing an example of a loop test setting screen in an embodiment.

Next, a loop test setting screen will be described using FIG. 3. FIG. 3 is a diagram showing an example of a loop test setting screen displayed by the device maintenance apparatus in an embodiment. For example, FIG. 3 shows a setting screen for setting an interval time and an output level of a simulation signal as a test pattern used in a loop test. In the present embodiment, a case in which a loop test of an output level (%) of a simulation signal is performed using a test pattern changing per interval time (second) is described.

In FIG. 3, the setting screen 1100 includes "load/save" 1111, "set interval time" 1112, "set test pattern" 1113, "set test pattern" 1114, "add output signal output block" 1121, "delete output signal output block" 1122, "start test" 1131 and "repeat setting" 1132.

The "load/save" 1111 is a button for loading (reading) or saving (storing) a test pattern set through the setting screen 1100. An operator can refer to a saved test pattern when a test pattern is newly set or changed by saving a created test pattern and loading the saved test pattern. For example, when "save" (save configuration in FIG. 3) is selected from the "load/save" 1111, the test pattern setter 103 saves a test pattern set through the setting screen 1100 in the HDD 14. In addition, when a plurality of field devices 19 are tested using the same test pattern, if the same saved test pattern is loaded whenever each field devices 19 is tested, the test pattern can be easily created to promote improvement of operation efficiency. Further, when different test patterns are set for field devices 19 which are test targets, the test pattern setter 103 may associate test patterns with identification information (for example, tag information or the like) of the field devices 19 to which the test patterns will be applied and save the associated information. Accordingly, when an inexperienced operator performs a test, the operator can be prevented from performing a test using a wrong test pattern by checking the identification information of a field device 19 which is a test target and loading the test pattern associated with the identification information by the test pattern setter 103.

The "set interval time" 1112 is a pull-down menu for setting an interval time of a test pattern. The interval time can be selected as any of 3 seconds, 5 seconds, 10 seconds and 15 seconds through the pull-down menu. FIG. 3 shows that the interval time is set to 10 seconds in a text box. The interval time may be selected and input through the pull-down menu or set by directly inputting a numerical value into the text box using a keyboard or the like. The interval time set through the "set interval time" 1112 indicates a time (output time) during which one simulation signal output level is maintained. For example, an operator can input a time during which a simulation signal output from the field device 19 can be checked through a reception device as an interval time by selecting the time through the pull-down menu or setting the time using a keyboard or the like through the "set interval time" 1112. Accordingly, the operator can easily select an interval time during which data can be checked and thus can perform data checking on time.

The "set test pattern" 1113 is a button (including a pull-down menu) for setting output level transition in a test pattern. The "set test pattern" 1113 includes an output signal output block for setting an output level. In FIG. 3, output levels maintained for a set interval time are set in five output signal output blocks. FIG. 3 shows setting of transition of an output level through five steps of 0% (for 10 seconds)→50% (for 10 seconds)→100% (for 10 seconds)→50% (for 10 seconds)→0% (for 10 seconds) in five output signal output blocks.

For example, when a simulation signal is output at an output value in the range of 4 to 20 mA, the simulation signal is output at output levels of 0%=4 mA, 50%=12 mA and 100%=20 mA. Specifically, the device maintenance apparatus 1 sends, to the field device 19, a command signal for causing a current of 0% (4 mA) to be output from the field device 19 to a higher device or the like. Then, the field device 19 which has received this command signal outputs the current of 0% (4 mA) to the higher device or the like for a set interval time. When the interval time (for example, 10 seconds) has elapsed, the device maintenance apparatus 1 sends, to the field device 19, a command signal for causing a current of 50% (12 mA) that is the next output level to be output according to the test pattern. The field device 19 which has received this command signal outputs the current of 50% (12 mA) to the higher device or the like for the set interval time. In this manner, the device maintenance apparatus 1 causes the field device 19 to output a simulation signal according to the test pattern whenever the interval time elapses.

Meanwhile, although FIG. 3 shows a case in which the same interval time set in the test pattern is applied to output levels set in all output signal output blocks, different interval times may be set for respective set output signal output blocks or output levels.

The "add output signal output block" 1121 is a button for adding an output signal output block in a test pattern. The "delete output signal output block" 1122 is a button for deleting an output signal output block in a test pattern. FIG. 3 shows that a sixth output signal output block is added to the "set test pattern" 1114 by pressing the button of the "add output signal output block" 1121. An operator can arbitrarily set the number of output signal output blocks through the "add output signal output block" 1121 and the "delete output signal output block" 1122.

Figure 4A:
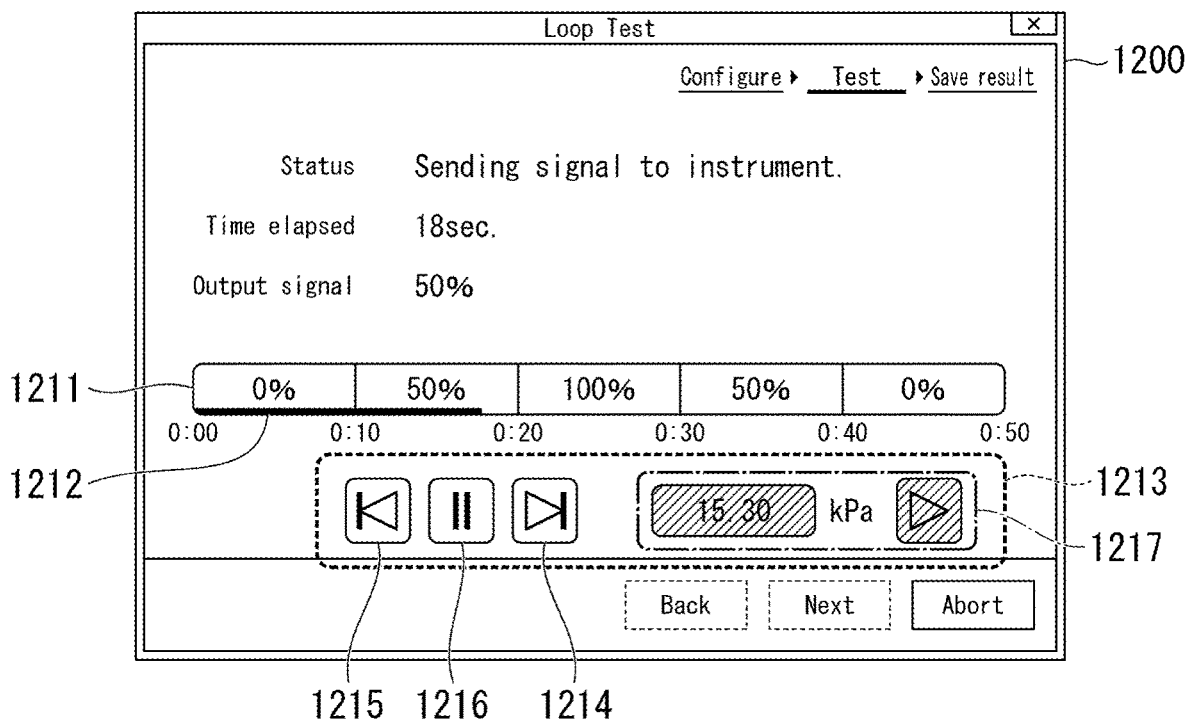
FIG. 4A is a diagram showing an example of a loop test execution screen in an embodiment.

The "start test" 1131 is a button for starting (executing) a loop test. When the "start test" 1131 has been selected, the test executor 105 causes the field device 19 to execute a loop test. In addition, when the "start test" 1131 has been selected, the display controller 102 switches display of the touch panel 15 from the setting screen 1100 shown in FIG. 3 to a loop test execution screen 1200 shown in FIG. 4A. The loop test execution screen 1200 shown in FIG. 4A is generated by the display data generator 101.

The "repeat setting" 1132 is a button for setting the number of repetitions of an output of a simulation signal based on a test pattern executed when the "start test" 1131 is selected. An operator can repeatedly execute a loop test based on a test pattern by the set number by selecting a check box of the "repeat setting" 1132.

The loop test setting screen has been described using FIG. 3.

Figure 4B:
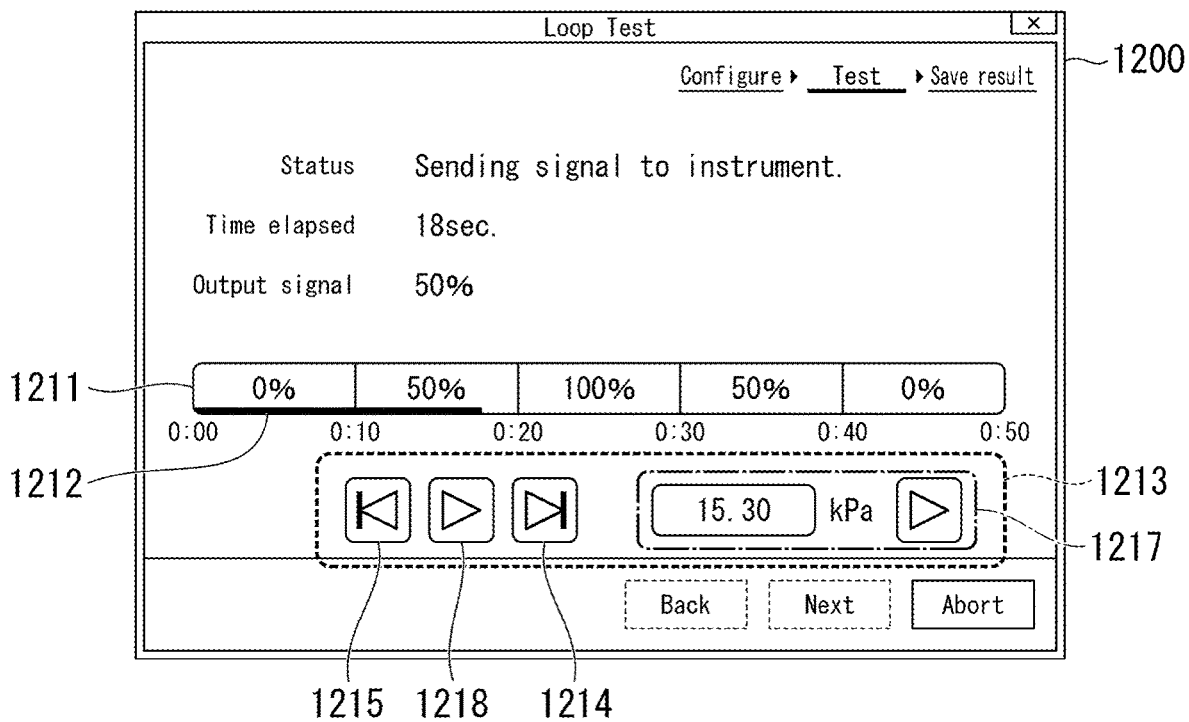
FIG. 4B is a diagram showing an example of a loop test execution screen in an embodiment.

Next, the loop test execution screen 1200 will be described using FIG. 4A and FIG. 4B. FIG. 4A and FIG. 4B are diagrams showing an example of the loop test execution screen 1200 displayed by the device maintenance apparatus 1 in an embodiment. In FIG. 4A and FIG. 4B, a display of "Sending signal to instrument" with respect to "Status" in the execution screen 1200 represents that a simulation signal output instruction is being sent. A display of "18 sec" with respect to "Time elapsed" represents an output elapsed time from the beginning of a test. A display of "50%" with respect to "Output signal" represents that a current simulation signal output level is 50%. Specifically, FIG. 4A and FIG. 4B show that the device maintenance apparatus 1 is outputting a command signal for causing a current of 50% (12 mA) to be output from the field device 19 to a higher device or the like to the field device 19.

The execution screen 1200 includes an output signal output block 1211, a progress bar 1212 and an interruption instruction button 1213.

The output signal output block 1211 indicates a simulation signal output level in a test pattern set through the setting screen 1100 of FIG. 3. In FIG. 4A and FIG. 4B, a plurality of steps are set for a set interval time in the output signal output block 1211. For example, the first step (from the start of a test (0 seconds) to 10 seconds) in the output signal output block 1211 indicates an output of a simulation signal at an output level of 0%. In addition, the second step (from 10 seconds after the start of the test to 20 seconds) in the output signal output block 1211 indicates an output of the simulation signal at an output level of 50%, for example. Further, the third step (from 20 seconds after the start of the test to 30 seconds) in the output signal output block 1211 indicates an output of the simulation signal at an output level of 100%, for example. In addition, the fourth step (from 30 seconds after the start of the test to 40 seconds) in the output signal output block 1211 indicates an output of the simulation signal at an output level of 50%, for example. Further, the fifth step (from 40 seconds after the start of the test to 50 seconds) in the output signal output block 1211 indicates an output of the simulation signal at an output level of 0%, for example.

The progress bar 1212 is a graphical indication which indicates a loop test progress state. FIG. 4A shows that a simulation signal is being output at an output level of 50% in the second step in the output signal output block 1211. An operator can easily recognize a loop test progress state according to the display of the progress bar 1212.

The interruption instruction button 1213 is a button for inputting an interruption instruction for changing at least one of the progress of output of a simulation signal and an output level of the simulation signal based on a test pattern during execution of a loop test. FIG. 4A shows a forwarding instruction button 1214, a returning instruction button 1215 and an output maintaining instruction button 1216 as buttons for changing the progress of output of a simulation signal based on a test pattern. In addition, FIG. 4A shows an output value change instruction button 1217 as a button for changing an output level of a simulation signal.

The forwarding instruction button 1214 is used for transition of a simulation signal output level caused to be output by the field device 19 to a simulation signal output level in the output signal output block 1211 which is not caused to be output by the field device 19 irrespective of an interval time. For example, when the forwarding instruction button 1214 is selected during an output of 50% (12 mA DC) which is the second step in the output signal output block 1211 shown in FIG. 4A, transition to the third step in the output signal output block 1211 occurs and thus an interruption instruction for causing the field device 19 to execute an output of 100% (20 mA DC) can be input to the test executor 105 irrespective of the interval time.

In addition, the forwarding instruction button 1214 can be successively selected. When the forwarding instruction button 1214 has been successively selected N times (N is an integer equal to or greater than 1), an interruption instruction for causing the field device 19 to execute an output set in advance by the selected number of times can be input to the test executor 105. For example, when the forwarding instruction button 1214 is successively selected twice during an output of 50% (12 mA DC) which is the second step in the output signal output block 1211 shown in FIG. 4A, transition to the fourth step in the output signal output block 1211 occurs and thus an interruption instruction for causing the field device 19 to perform an output of 50% (12 mA DC) can be input to the test executor 105 irrespective of the interval time.

As described above, it is possible to change a simulation signal output level caused to be output by the field device 19 to a simulation signal output level in the output signal output block 1211 which is set in a test pattern and is not caused to be output by the field device 19 by selecting the forwarding instruction button 1214.

The returning instruction button 1215 is a button used to change a simulation signal output level caused to be output by the field device 19 to an output from the beginning of a step in the output signal output block 1211 which is set in a test pattern and is caused to be performed by the field device 19 or a simulation signal output in the output signal output block 1211 which has been caused to be executed by the field device 19 irrespective of the interval time.

When the returning instruction button 1215 has been selected once, an interruption instruction for causing the field device 19 to execute an output according to the current step from the beginning of the step can be input to the test executor 105. For example, when the returning instruction button 1215 has been selected once during an output of 50% (12 mA DC) which is the second step in the output signal output block 1211 shown in FIG. 4A, it is possible to return to the beginning of the second step (for example, output elapsed time is 10 seconds) and input, to the test executor 105, an interruption instruction for causing the field device 19 to execute an output of 50% (12 mA DC) again from the output elapsed time of 10 seconds irrespective of the interval time. In this manner, when the returning instruction button 1215 has been selected once, an output level is not changed and becomes an output from the beginning of a step currently being executed.

In addition, the returning instruction button 1215 can be successively selected. When the returning instruction button 1215 has been successively selected M times (M is an integer equal to or greater than 2) within a short time (for example, a set time in the future), an interruption instruction for causing the field device 19 to execute an output of a step set in advance by (M−1) times can be input to the test executor 105.

For example, when the returning instruction button 1215 has been successively selected twice within a short time during an output of 100% (20 mA DC) which is the third step in the output signal output block 1211 shown in FIG. 4A, it is possible to return to the second step in the output signal output block 1211 and input an interruption instruction for causing the field device 19 to execute an output of 50% (12 mA DC) to the test executor 105 irrespective of the interval time.

In addition, when the returning instruction button 1215 has been successively selected three times within a short time during an output of 100% (20 mA DC) which is the third step in the output signal output block 1211 shown in FIG. 4A, for example, it is possible to return to the first step in the output signal output block 1211 and input an interruption instruction for causing the field device 19 to execute an output of 0% (4 mA DC) to the test executor 105 irrespective of the interval time.

As described above, when the returning instruction button 1215 has been selected multiple (for example, M) times, the current output level changes to an output level of a step (M−1) times ahead of the current step and becomes an output from the beginning of the step after the change.

As described above, it is possible to change a simulation signal output level caused to be output by the field device 19 to an output from the beginning of a step in the output signal output block 1211 which is set in a test pattern and caused to be executed by the field device 19 or a simulation signal output level in the output signal output block 1211 which has been set in the test pattern and has been caused to be output by the field device 19 by selecting the returning instruction button 1215.

The output maintaining instruction button 1216 is a button used to maintain a simulation signal output level caused to be output by the field device 19. For example, when the output maintaining instruction button 1216 has been selected during an output of 50% (12 mA DC) which is the second step in the output signal output block 1211 shown in FIG. 4A, an interruption instruction for maintaining the current level currently being output (for example, 50% (12 mA DC) which is the second step in the output signal output block 1211) can be input to the test executor 105 irrespective of the interval time.

Meanwhile, the display controller 102 switches display of the output maintaining instruction button 1216 of FIG. 4A to display of an output maintaining instruction button 1218 of FIG. 4B according to selection of the output maintaining instruction button 1216. Here, the progress of the output elapsed time temporarily stops. That is, the test executor 105 stops counting of the output elapsed time. In addition, when the output maintaining instruction button 1218 has been selected, the display controller 102 switches display of the output maintaining instruction button 1218 to display of the output maintaining instruction button 1216. Here, the progress of the output elapsed time is resumed. That is, an interruption instruction for resuming counting of the output elapsed time is input to the test executor 105 such that the test executor 105 resumes counting of the output elapsed time.

Further, the display controller 102 displays the output value change instruction button 1217 in the execution screen 1200 such that the output value change instruction button 1217 cannot be selected during the progress of the output elapsed time, as shown in FIG. 4A. For example, the display controller 102 displays the output value change instruction button 1217 in a grayscale such that the output value change instruction button 1217 cannot be selected. In addition, when the progress of the output elapsed time stops, that is, when the output maintaining instruction button 1216 is selected, the display controller 102 displays the output value change instruction button 1217 in the execution screen 1200 such that the output value change instruction button 1217 can be selected, as shown in FIG. 4B. Meanwhile, the display form in which the display controller 102 causes the output value change instruction button 1217 to be unable to be selected is not limited to the above one. For example, the display controller 102 may not display the output value change instruction button 1217 in the execution screen 1200 such that the output value change instruction button 1217 cannot be selected during the progress of the output elapsed time.

The output value change instruction button 1217 is a button used when the field device 19 is caused to output a simulation signal at an arbitrary output level irrespective of an output level set in a test pattern. An operator inputs a value of an output level desired to be output to a text box in the output value change instruction button 1217. Then, when a triangular button in the output value change instruction button 1217 is selected, an interruption instruction for causing a simulation signal at an arbitrary output level to be output is input to the test executor 105 and thus the test executor 105 can cause the field device 19 to output a simulation signal at a designated output level.

Further, the interruption instruction button 1213 may be provided in an interruption instruction input screen for inputting an interruption instruction instead of the loop test execution screen 1200. When the screen is configured in this manner, the display data generator 101 generates display data of the interruption instruction input screen according to an operation for inputting an interruption instruction. In addition, the display controller 102 causes the touch panel 15 to display the interruption instruction input screen generated by the display data generator 101. The interruption instruction button 1213 shown in FIG. 4B is displayed on the interruption instruction input screen. In this manner, when a screen for inputting an interruption instruction is provided as a screen different from the test execution screen 1200, it is possible to prevent an operator from inputting a wrong interruption instruction during a test.

Figure 5:
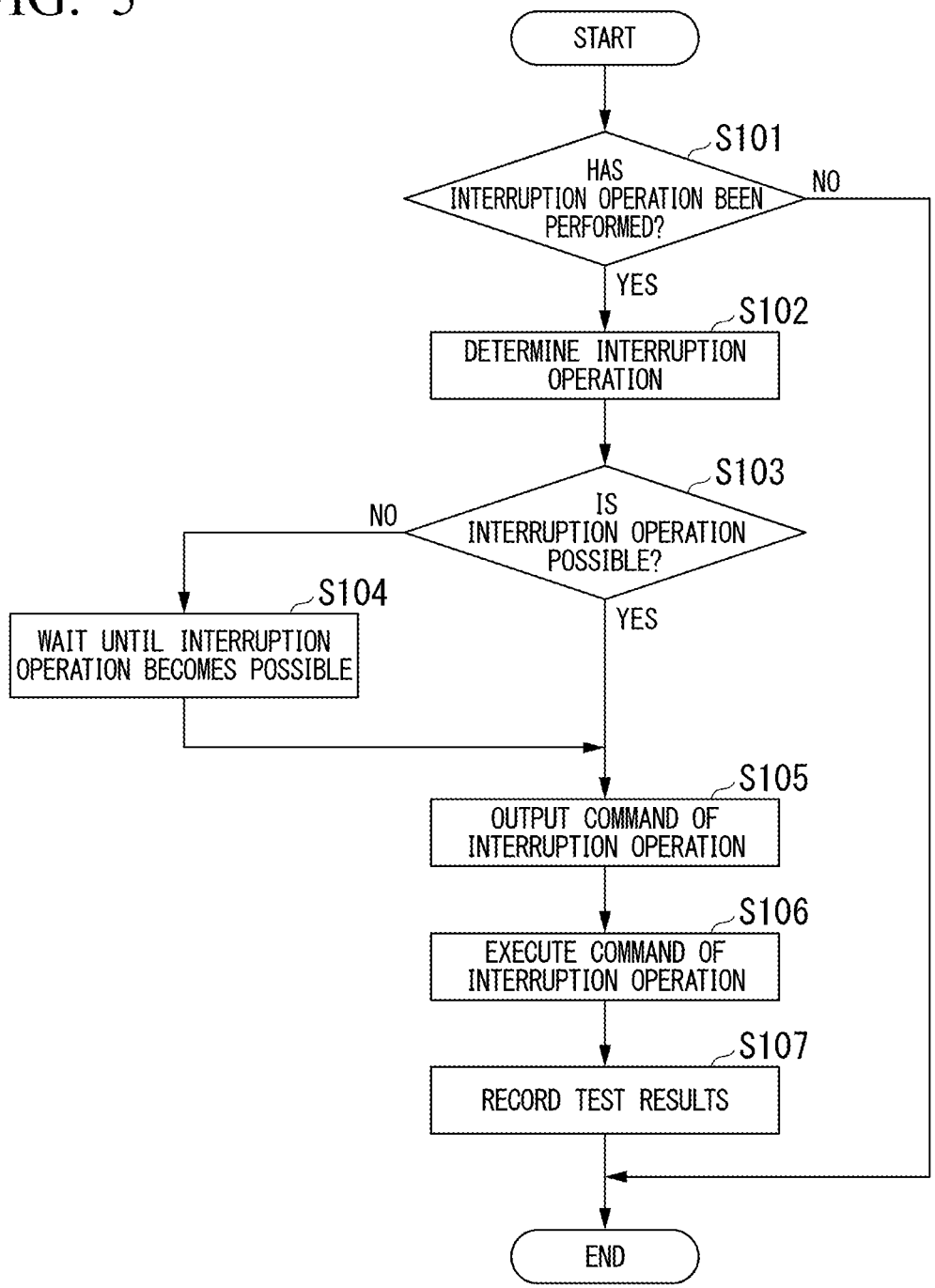
FIG. 5 is a flowchart showing a flow of an interruption process performed by a device maintenance apparatus.

FIG. 5 is a flowchart showing a flow of an interruption process performed by the device maintenance apparatus 1. Further, the process of FIG. 5 is performed while the test executor 105 causes the field device 19 to execute an output of an output signal.

The device maintenance apparatus 1 determines whether an interruption operation has been performed (step S101). When the interruption operation has not been performed (NO in step S101), the device maintenance apparatus 1 ends the process of FIG. 5.

On the other hand, when the interruption operation has been performed (YES in step S101), the interruption operation instructor 106 determines the interruption operation (step S102). Specifically, the interruption operation instructor 106 determines which one of the interruption operations shown in FIG. 4A and FIG. 4B has been performed. The interruption operation instructor 106 outputs a determination result to the test state checker 107 as an interruption signal.

The test state checker 107 checks a test execution state and determines whether the interruption operation is possible (step S103). When the interruption operation is not possible (NO in step S103), the test state checker 107 waits until the interruption operation becomes possible (step S104). When the interruption operation is possible (YES in step S103) or the interruption operation becomes possible in step S104, the test state checker 107 outputs a command of the interruption operation to the interruption instructor 108 as an interruption signal. The interruption instructor 108 outputs the command of the interruption operation to the test executor 105 as an interruption signal (step S105).

The test executor 105 executes the command of the interruption operation (step S106). Hereinafter, a process in the case of the state shown in FIG. 4A, that is, a state in which an output of 50% (12 mA DC) which is the second output of the test pattern is executed will be described as an example. When the forwarding instruction button 1214 in the execution screen 1200 shown in FIG. 4A has been selected once, the interruption operation instructor 106 generates an interruption signal representing that the forwarding instruction button 1214 has been selected once. Then, the interruption operation instructor 106 outputs the generated interruption signal to the test state checker 107.

When the test state checker 107 has received the interruption signal representing that the forwarding instruction button 1214 has been selected once, the test state checker 107 outputs an instruction signal (including data of step=100% and output elapsed time=20 seconds) for instructing the next step to be performed to the test executor 105 through the interruption instructor 108 as an interruption instruction on the basis of the current test state (for example, the step (50%) currently being output and the current output elapsed time (18 seconds)) received from the test executor 105, and the test pattern. The test executor 105 causes a signal according to the next step (100%) to be output by outputting the instruction signal output from the interruption instructor 108 to the field device 19 through the communicator 109. For example, since the instruction signal output from the interruption instructor 108 includes an instruction indicating that the output elapsed time is 20 seconds, the test executor 105 regards the output elapsed time as 20 seconds, starts counting of the output elapsed time from 20 seconds, and causes the field device 19 to output the signal according to the next step (100%) during an interval time.

In addition, when the forwarding instruction button 1214 in the execution screen 1200 shown in FIG. 4A has been selected twice within a short time, the interruption operation instructor 106 generates an interruption signal representing that the forwarding instruction button 1214 has been selected twice within a short time. Then, the interruption operation instructor 106 outputs the generated interruption signal to the test state checker 107.

When the test state checker 107 has received the interruption signal representing that the forwarding instruction button 1214 has been selected twice within a short time, the test state checker 107 outputs an instruction signal (including data of step=50% and output elapsed time=30 seconds) for instructing a step that is two steps ahead of the current step to be performed to the test executor 105 through the interruption instructor 108 as an interruption instruction on the basis of the current test state (for example, the step (50%) currently being output and the current output elapsed time (18 seconds)) received from the test executor 105, and the test pattern. The test executor 105 outputs the instruction signal output from the interruption instructor 108 to the field device 19 through the communicator 109 to cause the field device 19 to output a signal according to the step (50%) that is two steps ahead of the current step. For example, since the instruction signal output from the interruption instructor 108 includes an instruction indicating that the output elapsed time is 30 seconds, the test executor 105 regards the output elapsed time as 30 seconds, starts counting of the output elapsed time from 30 seconds, and causes the field device 19 to output the signal according to the next step (50%) during the interval time.

In addition, when the returning instruction button 1215 in the execution screen 1200 shown in FIG. 4A has been selected once, the interruption operation instructor 106 generates an interruption signal representing that the returning instruction button 1215 has been selected once. Then, the interruption operation instructor 106 outputs the generated interruption signal to the test state checker 107.

When the test state checker 107 has received the interruption signal representing that the returning instruction button 1215 has been selected once, the test state checker 107 outputs an instruction signal (including data of step=50% and output elapsed time=10 seconds) for instructing the current step to be performed from the beginning to the test executor 105 through the interruption instructor 108 as an interruption instruction on the basis of the current test state (for example, the step (50%) currently being output and the current output elapsed time (18 seconds)) received from the test executor 105, and the test pattern. The test executor 105 outputs the instruction signal output from the interruption instructor 108 to the field device 19 through the communicator 109 to cause the field device 19 to output a signal according to the current step (50%). For example, since the instruction signal output from the interruption instructor 108 includes an instruction indicating that the output elapsed time is 10 seconds, the test executor 105 regards the output elapsed time as 10 seconds, starts counting of the output elapsed time from 10 seconds, and causes output of the signal according to the current step (50%) caused to be performed by the field device 19 to be performed from the beginning during the interval time.

Further, when the returning instruction button 1215 in the execution screen 1200 shown in FIG. 4A has been selected twice within a short time, the interruption operation instructor 106 generates an interruption signal representing that the returning instruction button 1215 has been selected twice within a short time. Then, the interruption operation instructor 106 outputs the generated interruption signal to the test state checker 107.

When the test state checker 107 has received the interruption signal representing that the returning instruction button 1215 has been selected twice within a short time, the test state checker 107 outputs an instruction signal (including data of step=0% and output elapsed time=0 seconds) for instructing a step that is one step ahead of the current step to be performed to the test executor 105 through the interruption instructor 108 as an interruption instruction on the basis of the current test state (for example, the step (50%) currently being output and the current output elapsed time (18 seconds)) received from the test executor 105, and the test pattern. The test executor 105 outputs the instruction signal output from the interruption instructor 108 to the field device 19 through the communicator 109 to cause the field device 19 to output a signal according to the step (0%) that is one step ahead of the current step. For example, since the instruction signal output from the interruption instructor 108 includes an instruction indicating that the output elapsed time is 0 seconds, the test executor 105 regards the output elapsed time as 0 seconds, starts counting of the output elapsed time from 0 seconds, and causes the field device 19 to output the signal according to the step (0%) that is one step ahead of the current step from the beginning during the interval time.

In addition, when the output maintaining instruction button 1216 in the execution screen 1200 shown in FIG. 4A has been selected, the interruption operation instructor 106 generates an interruption signal representing that the output maintaining instruction button 1216 has been selected. Then, the interruption operation instructor 106 outputs the generated interruption signal to the test state checker 107.

When the test state checker 107 has received the interruption signal representing that the output maintaining instruction button 1216 has been selected, the test state checker 107 outputs an instruction signal for stopping counting of the output elapsed time to the test executor 105 as an interruption instruction through the interruption instructor 108. The test executor 105 temporarily stops counting of the output elapsed time on the basis of the instruction signal output from the interruption instructor 108. Accordingly, counting of the output elapsed time is stopped but the simulation signal output level output from the field device 19 is maintained. Further, the test executor 105 notifies the display controller 102 that the interruption instruction indicating stop of counting of the output elapsed time has been received.

The display controller 102 switches the output maintaining instruction button 1216 in the execution screen 1200 to the output maintaining instruction button 1218 shown in FIG. 4B according to the notification from the test executor 105 and stops the progress of the progress bar 1212. In addition, the display controller 102 controls display such that an input for setting the output value change instruction button 1217 can be received. That is, the display controller 102 switches the output value change instruction button 1217 from a grayscale state to a state in which an input can be received through the output value change instruction button 1217.

In addition, when the output maintaining instruction button 1218 in the execution screen 1200 shown in FIG. 4B has been selected, the interruption operation instructor 106 generates an interruption signal representing that the output maintaining instruction button 1218 has been selected. Then, the interruption operation instructor 106 outputs the generated interruption signal to the test state checker 107. When the test state checker 107 has received the interruption signal representing that the output maintaining instruction button 1218 has been selected, the test state checker 107 outputs an instruction signal for resuming the operation to the test executor 105 as an interruption instruction through the interruption instructor 108. The test executor 105 resumes counting of the output elapsed time on the basis of the instruction signal output from the interruption instructor 108. Further, the test executor 105 notifies the display controller 102 that the interruption instruction indicating resumption of the operation has been received.

In addition, The display controller 102 switches the output maintaining instruction button 1218 in the execution screen 1200 to the output maintaining instruction button 1216 shown in FIG. 4A according to the notification from the test executor 105 and resumes the progress of the progress bar 1212. Further, the display controller 102 controls display such that an input for setting the output value change instruction button 1217 is not received. That is, the display controller 102 switches the output value change instruction button 1217 from a state in which an input can be received through the output value change instruction button 1217 to a grayscale state.

Further, when an output level value has been set through the output value change instruction button 1217 and thus the triangular button has been selected in a state in which the output maintaining instruction button 1216 in the execution screen 1200 shown in FIG. 4A has been selected to stop counting of the output elapsed time, the interruption operation instructor 106 generates an interruption signal (including the output level value) representing that the output level value has been set through the output value change instruction button 1217. Then, the interruption operation instructor 106 outputs the generated interruption signal to the test state checker 107. Meanwhile, the value set through the output value change instruction button 1217 may be a percentage (%) value between LRV (pressure low limit value) and URV (pressure upper limit value) in addition to a pressure value (kPa).

When the test state checker 107 has received the interruption signal representing that the output level value has been set through the output value change instruction button 1217, the test state checker 107 outputs the an instruction signal for changing the output level to the set output level to the test executor 105 and the display controller 102 through the interruption instructor 108 as an interruption instruction. The test executor 105 outputs the instruction signal output from the interruption instructor 108 to the field device 19 through the communicator 109 to cause the field device 19 to output a simulation signal according to the output level set through the output value change instruction button 1217 in a state in which counting of the output elapsed time is stopped.

Further, when the test state checker 107 has received an interruption signal representing that the output maintaining instruction button 1218 has been set selected, the test state checker 107 outputs an instruction signal for performing (resuming) counting of the output elapsed time to the test executor 105 through the interruption instructor 108 as an interruption instruction. The test executor 105 causes the field device 19 to output a simulation signal at an output level before the output level set in the test pattern is changed and perform (resume) counting of the output elapsed time before the output level is changed on the basis of the output instruction signal.

The test result recorder 110 records test results in the HDD 14 (step S107).

According to the device maintenance apparatus 1 configured as above, it is possible to promote the improvement of the operation efficiency of a maintenance operation by inputting an interruption instruction for changing at least one of the progress of output of a simulation signal based on a test pattern and an output level of the simulation signal and causing a field device to perform an operation according to the input interruption instruction.

In addition, the device maintenance apparatus 1 can change a simulation signal output level caused to be output by the field device 19 to a previous simulation signal output level set in a test pattern irrespective of an interval time by including the forwarding instruction button 1214. Accordingly, when a simulation signal output checking operation is completed before the interval time or in the case of a pattern that is not necessary for a test of a specific field device 19 when a general-purpose test pattern is used, it is not necessary to wait for a predetermined time and thus operation efficiency can be further improved.

Further, there are cases in which a time is taken for a signal value that can be received with respect to a certain signal to be stabilized in plant instrumentation. For example, there are cases in which a signal path configuration and conditions (physical or logical factors) for establishing a signal path have not been arranged, and the like. In such cases, when transition to an output of the next output level occurs because a simulation signal interval time set in advance has elapsed and thus test results cannot be checked, a test pattern in which a long interval time is set needs to be provided and executed. In contrast, the device maintenance apparatus 1 can change a simulation signal output level caused to be output by the field device 19 to a simulation signal output level that has been set in a test pattern and already executed or change an output elapsed time in order to return to the beginning of the current step irrespective of an interval time by including the returning instruction button 1215. Accordingly, it is possible to check a simulation signal output level that was not able to be checked.

There are cases in which a time is taken for a signal value that can be received with respect to a certain signal to be stabilized in plant instrumentation. For example, there are cases in which a signal path configuration and conditions (physical or logical factors) for establishing a signal path have not been arranged, and the like. In such cases, when waiting until a received signal is stabilized is performed or a time to arrange conditions is secured, transition to an output of the next output level occurs due to the elapse of an interval time and thus test results cannot be checked. In contrast, the device maintenance apparatus 1 can maintain a simulation signal output caused to be executed by the field device 19 at a certain output level by including the output maintaining instruction button 1216. Accordingly, when a time is required for checking such as a case in which a plurality of reception terminals check one simulation signal output and a case in which it is necessary to obtain different results by switching conditions for establishing a signal path, it is possible to maintain a certain output level and check output of a simulation signal without repeatedly executing a test pattern.

In plant instrumentation tests, an alarm may be generated or another sequence is enabled when a received signal exceeds (or is less than) a threshold value set in advance. The device maintenance apparatus 1 can designate an output level that an operator wants to check and perform a test according to the designated output level by including the output value change instruction button 1217. Accordingly, it is not necessary to provide individual test patterns. Therefore, it is possible to easily perform loop tests for various purposes. For example, when a system in which an alarm is generated when a received signal exceeds 80% of a threshold value in a reception device is constructed, it is possible to check that an alarm is not generated at 79% and an alarm is generated at 81% using the output value change instruction button 1217.

Modified Example

Although a configuration in which the test state checker 107 receives a test pattern from the test executor 105 is described in the present embodiment, the test state checker 107 may be configured not to receive a test pattern from the test executor 105. When the test state checker 107 is configured in this manner, the test state checker 107 outputs only a signal representing that the forwarding instruction button 1214 has been selected to the test executor 105 through the interruption instructor 108 when the forwarding instruction button 1214 has been selected, and the test executor 105 determines an output level according to the number of selections of the forwarding instruction button 1214 and causes the field device 19 to output the determined output level.

In addition, the test state checker 107 outputs only a signal representing that the returning instruction button 1215 has been selected to the test executor 105 through the interruption instructor 108 when the returning instruction button 1215 has been selected, and the test executor 105 determines an output level according to the number of selections of the returning instruction button 1215 and causes the field device 19 to output the determined output level.

Although a configuration in which an output level can be designated through the output value change instruction button 1217 when the output maintaining instruction button 1216 has been selected is described in the present embodiment, a configuration in which an output level can be directly designated through the output value change instruction button 1217 although the output maintaining instruction button 1216 has not been selected may be possible. In such a configuration, the display data generator 101 generates display data for displaying the execution screen 1200 shown in FIG. 6. The display controller 102 displays the display data generated by the display data generator 101 on the touch panel 15.

Figure 6:
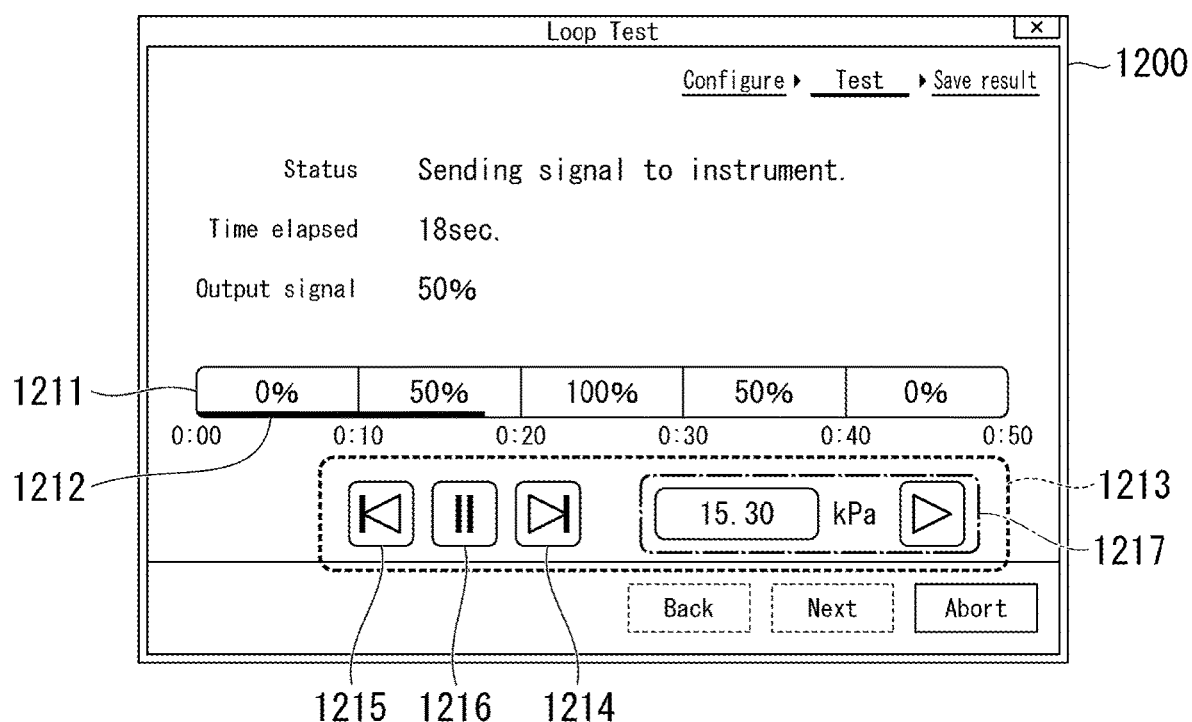
FIG. 6 is a diagram showing an example of a loop test execution screen in a modified example.

FIG. 6 is a diagram showing an example of a loop test execution screen 1200 in a modified example. As shown in FIG. 6, in the loop test execution screen 1200 in the modified example, an output level can be designated through the output value change instruction button 1217 although the output maintaining instruction button 1216 has not been selected. That is, an output level can be directly designated through the output value change instruction button 1217.

An operator inputs a value of an output level desired to be output to the text box in the output value change instruction button 1217. Then, an interruption instruction for instructing a simulation signal at the designated output level to be output is input to the test executor 105 according to selection of the triangular button in the output value change instruction button 1217. Specifically, the interruption operation instructor 106 generates an interruption signal (including the value of the output level) representing that the value of the output level has been set through the output value change instruction button 1217. Then, the interruption operation instructor 106 outputs the generated interruption signal to the test state checker 107. When the test state checker 107 has received the interruption signal representing that the value of the output level has been set through the output value change instruction button 1217, the test state checker 107 outputs an instruction signal (including an instruction for causing the output level to be changed and the value of the output level) for causing the output level to be changed to the set output level to the test executor 105 through the interruption instructor 108 as an interruption instruction.

When the interruption instruction is input, the test executor 105 causes the field device 19 to output a simulation signal at the output level included in the interruption instruction. Meanwhile, since counting of an interval time is not stopped, the test executor 105 causes the field device 19 to output the simulation signal at the designated output level until the interval time that is being counted elapses. Then, when the interval time has elapsed, the test executor 105 causes the field device 19 to output a simulation signal at the next output level set in a test pattern. Specifically, the test executor 105 causes the field device 19 to output a simulation signal at an output level set in the test pattern as an output level following an output level caused to be output from the field device 19 immediately before the simulation signal at the output level included in the interruption instruction is caused to be output.

According to this configuration, it is possible to cause the field device 19 to output a simulation signal at a designated output level even during the elapse of an interval time. Accordingly, it is possible to increase a degree of freedom and improve convenience.

<Expansion of Application Range>

It is possible to expand the application range to application operation checking as well as cable signal transmission checking generally called an input loop test by expanding a range indicated by a conventional loop to signal paths in an application composed of a higher system, panel instrumentation and the like as well as physical wires.

According to the aforementioned configuration, it is possible to promote improvement of the operation efficiency of a maintenance operation by inputting a change instruction for changing at least one of the progress of output of an output signal based on a test pattern and an output value of the output signal and causing a device to perform an operation according to the input change instruction.

According to one aspect of the present invention, in the aforementioned device maintenance apparatus, the change instruction for changing the progress of the output of the output signal based on the test pattern may be a forwarding instruction for changing the output of the output signal executed by the device to an output of an output signal which is set in the test pattern and is not executed by the device.

According to the aforementioned configuration, it is possible to change an output of an output signal caused to be executed by a device to an output of a previous output signal set in a test pattern irrespective of an interval time until the output of the output signal caused to be executed by the device is switched according to the test pattern. In this manner, it is possible to reduce an operation time of a test by changing the current output of the output signal to an output of a previous output signal set in the test pattern without waiting for the elapse of an interval time.

According to one aspect of the present invention, in the aforementioned device maintenance apparatus, the change instruction for changing the progress of the output of the output signal based on the test pattern may be a returning instruction for changing the output of the output signal executed by the device to an output from a time at which the output of the output signal started or to an output of an output signal which has been executed by the device.

According to the aforementioned configuration, it is possible to return an output of an output signal caused to be executed by a device to an output of an output signal that has been set in a test pattern and already been executed irrespective of an interval time. Accordingly, it is possible to execute an output of an output signal that has already been executed but has not been able to be checked and check the output again.

According to one aspect of the present invention, in the aforementioned device maintenance apparatus, the change instruction for changing the progress of the output of the output signal based on the test pattern may be an output maintaining instruction for causing the device to maintain the output of the output signal which is being executed.

According to the aforementioned configuration, it is possible to cause a device to maintain an output of an output signal which is being executed as a certain output value of a test pattern. Accordingly, in a case in which a plurality of reception terminal check one output signal, a case in which it is necessary to obtain different results by switching conditions, and the like, it is possible to perform a test which is useful when a time for checking an output signal exceeds an interval time set in advance and does not require repeated execution of a test pattern in the test.

According to one aspect of the present invention, in the aforementioned device maintenance apparatus, the change instruction for changing the output value of the output signal may be an output value change instruction for causing the device to execute the output of the output signal as a designated output value.

According to the aforementioned configuration, since an operator designates an output value that the operator wants to check and a device can be caused to execute an output of an output signal as the output value designated by the operator, it is possible to perform a test according to an arbitrary output value.

According to one aspect of the present invention, in the aforementioned device maintenance apparatus, the change instruction may be an instruction for causing the device to maintain the output of the output signal which is being executed and then change the output value of the output signal output from the device to a designated output value.

According to the aforementioned configuration, it is possible to change an output value of an output signal caused to be output from a device in a state in which the device is caused to maintain an output of an output signal which is being executed as a certain output value in a test pattern. Accordingly, an operator can designate an output value that the operator wants to check and cause the device to output an output signal according to the output value designated by the operator irrespective of an output value which is being output. Therefore, it is possible to perform a test according to an arbitrary output value.

According to one aspect of the present invention, the aforementioned device maintenance apparatus may further include a display data generator configured to generate display data of a setting screen for setting the test pattern, and a display controller configured to display the display data of the setting screen generated by the display data generator on a display.

According to one aspect of the present invention, the aforementioned device maintenance apparatus may further include a test pattern setter configured to set the test pattern input through the setting screen displayed on the display, wherein the test executor may cause the device to output the output signal based on the test pattern set by the test pattern setter.

According to one aspect of the present invention, in the aforementioned device maintenance apparatus, the test pattern may include information an interval time, an output level, and a number of repetition of the output signal.

According to one aspect of the present invention, the aforementioned device maintenance apparatus may further include a storage medium which stores a device maintenance program, and a processor configured to execute the device maintenance program stored in the storage medium to implement the test executor and the change instructor.

One aspect of the present invention is a device maintenance method which may include causing, by a test executor, a device to output an output signal based on a test pattern that changes the output signal output from the device with an elapse of time, and issuing, by a change instructor, a change instruction for changing at least one of a progress of an output of the output signal based on the test pattern and an output value of the output signal to the test executor in accordance with an instruction input while the test executor causes the device to execute the output of the output signal.

According to one aspect of the present invention, in the aforementioned device maintenance method, the change instruction for changing the progress of the output of the output signal based on the test pattern may be a forwarding instruction for changing the output of the output signal executed by the device to an output of an output signal which is set in the test pattern and is not executed by the device.

According to one aspect of the present invention, in the aforementioned device maintenance method, the change instruction for changing the progress of the output of the output signal based on the test pattern may be a returning instruction for changing the output of the output signal executed by the device to an output from a time at which the output of the output signal started or to an output of an output signal which has been executed by the device.

According to one aspect of the present invention, in the aforementioned device maintenance method, the change instruction for changing the progress of the output of the output signal based on the test pattern may be an output maintaining instruction for causing the device to maintain the output of the output signal which is being executed.

According to one aspect of the present invention, in the aforementioned device maintenance method, the change instruction for changing the output value of the output signal may be an output value change instruction for causing the device to execute the output of the output signal as a designated output value.

According to one aspect of the present invention, in the aforementioned device maintenance method, the change instruction may be an instruction for causing the device to maintain the output of the output signal which is being executed and then change the output value of the output signal output from the device to a designated output value.

According to one aspect of the present invention, the aforementioned device maintenance method may further include generating, by a display data generator, display data of a setting screen for setting the test pattern, and displaying, by a display controller, the display data of the setting screen generated by the display data generator on a display.

According to one aspect of the present invention, the aforementioned device maintenance method may further include setting, by a test pattern setter, the test pattern input through the setting screen displayed on the display, and causing, by the test executor, the device to output the output signal based on the test pattern set by the test pattern setter.

According to one aspect of the present invention, in the aforementioned device maintenance method, the test pattern may include information an interval time, an output level, and a number of repetition of the output signal.

The device maintenance method achieves a technical effect which is the same as that of the device maintenance method.

One aspect of the present invention is a device maintenance program configured for execution by a computer. The device maintenance program may include instructions for causing, by a test executor, a device to output an output signal based on a test pattern that changes the output signal output from the device with an elapse of time, and issuing, by a change instructor, a change instruction for changing at least one of a progress of an output of the output signal based on the test pattern and an output value of the output signal to the test executor in accordance with an instruction input while the test executor causes the device to execute the output of the output signal.

One aspect of the present invention is a non-transitory computer readable storage medium which may store one or more device maintenance programs configured for execution by a computer. The one or more device maintenance programs may include instructions for causing, by a test executor, a device to output an output signal based on a test pattern that changes the output signal output from the device with an elapse of time, and issuing, by a change instructor, a change instruction for changing at least one of a progress of an output of the output signal based on the test pattern and an output value of the output signal to the test executor in accordance with an instruction input while the test executor causes the device to execute the output of the output signal.

The device maintenance program and the non-transitory computer readable storage medium achieve a technical effect which is the same as that of the device maintenance method.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A device maintenance apparatus that supports a maintenance operation of a field device installed in a plant, the device maintenance apparatus comprising a hardware-processor configured to read a program from a recording medium and execute the program to implement:
   a test executor configured to cause the field device to output a simulation signal based on a test pattern that changes the simulation signal output from the field device with an elapse of time;
   a display controller configured to display an execution screen, which includes an output maintaining instruction button and an output value change instruction button on a display device, the output maintaining instruction being for instructing to maintain an output level of the simulation signal, the output value change instruction being for instructing to change an output value of the simulation signal; and
   an interruption instructor configured to issue the output maintaining instruction and the output value change instruction to the test executor in accordance with an instruction input from the execution screen while the test executor causes the field device to provide the simulation signal,
   wherein the output value change instruction button comprises a text box to which a value of the output level is input,
   wherein the display controller is configured to:
   display, on the display device, the output value change instruction button such that the value of the output level cannot be input to the text box when the output maintaining instruction button is not selected from the execution screen; and
   display, on the display device, the output value change instruction button such that the value of the output level can be input to the text box when the output maintaining instruction button is selected from the execution screen, and
   wherein the test executor is configured to cause the field device to output the simulation signal based on the value of the output level which has been input to the text box.

2. The device maintenance apparatus according to claim 1,
   wherein the interruption instructor is configured to issue, to the test executor, a forwarding instruction for forwarding an output level of the simulation signal.

3. The device maintenance apparatus according to claim 1,
   wherein the interruption instructor is configured to issue, to the test executor, a returning instruction for returning an output elapsed time of the simulation signal.

4. The device maintenance apparatus according to claim 1, further comprising:
   a display data generator configured to generate display data of a setting screen for setting the test pattern,
   wherein the display controller is configured to display the display data of the setting screen generated by the display data generator on the display device.

5. The device maintenance apparatus according to claim 4, further comprising:
   a test pattern setter configured to set the test pattern input through the setting screen displayed on the display device,
   wherein the test executor causes the field device to output the simulation signal based on the test pattern set by the test pattern setter.

6. The device maintenance apparatus according to claim 1,
   wherein the test pattern comprises information of an interval time, an output level, and a number of repetition of a test cycle.

7. A device maintenance method performed by a device maintenance apparatus that supports a maintenance operation of a field device installed in a plant, the device maintenance apparatus comprising a hardware-processor configured to read a program from a recording medium and execute the program, the device maintenance method comprising:
   causing, by a test executor, the field device to output a simulation signal based on a test pattern that changes the simulation signal output from the field device with an elapse of time;
   displaying, by a display controller, an execution screen, which includes an output maintaining instruction button and an output value change instruction button on a display device, the output maintaining instruction being for instructing to maintain an output level of the simulation signal, the output value change instruction being for instructing to change an output value of the simulation signal; and
   issuing, by an interruption instructor, the output maintaining instruction and the output value change instruction to the test executor in accordance with an instruction input from the execution screen while the test executor causes the field device to provide the simulation signal,
   wherein the output value change instruction button comprises a text box to which a value of the output level is input,
   wherein the output value change instruction button comprises a text box to which a value of the output level is input,
   wherein the device maintenance method further comprises:
   displaying, by the display controller, on the display device, the output value change instruction button such that the value of the output level cannot be input to the text box when the output maintaining instruction button is not selected from the execution screen;

displaying, by the display controller, on the display device, the output value change instruction button such that the value of the output level can be input to the text box when the output maintaining instruction button is selected from the execution screen; and causing, by the text executor, the field device to output the simulation signal based on the value of the output level which has been input to the text box.

8. The device maintenance method according to claim 7, further comprising:

issuing, by the interruption instructor, to the test executor, a forwarding instruction for forwarding an output level of the simulation signal.

9. The device maintenance method according to claim 7, further comprising:

issuing, by the interruption instructor, to the test executor, a returning instruction for returning an output elapsed time of the simulation signal.

10. The device maintenance method according to claim 7, further comprising:

generating, by a display data generator, display data of a setting screen for setting the test pattern; and displaying, by the display controller, the display data of the setting screen generated by the display data generator on display device.

11. The device maintenance method according to claim 10, further comprising:

setting, by a test pattern setter, the test pattern input through the setting screen displayed on the display device; and causing, by the test executor, the field device to output the simulation signal based on the test pattern set by the test pattern setter.

12. The device maintenance method according to claim 7, wherein the test pattern comprises information of an interval time, an output level, and a number of repetition of a test cycle.

13. A non-transitory computer readable storage medium storing one or more device maintenance programs configured for execution by a device maintenance apparatus that supports a maintenance operation of a field device installed in a plant, the device maintenance apparatus comprising a hardware-processor configured to read a program from a recording medium and execute the program, the one or more device maintenance programs comprising instructions for:

causing, by a test executor, the field device to output a simulation signal based on a test pattern that changes the simulation signal output from the field device with an elapse of time;

displaying, by a display controller, an execution screen, which includes an output maintaining instruction button and an output value change instruction button on a display device, the output maintaining instruction being for instructing to maintain an output level of the simulation signal, the output value change instruction being for instructing to change an output value of the simulation signal; and issuing, by an interruption instructor, the output maintaining instruction and the output value change instruction to the test executor in accordance with an instruction input from the execution screen while the test executor causes the field device to provide the simulation signal, wherein the output value change instruction button comprises a text box to which a value of the output level is input, wherein the one or more device maintenance programs further comprises instructions for:

displaying, by the display controller, on the display device, the output value change instruction button such that the value of the output level cannot be input to the text box when the output maintaining instruction button is not selected from the execution screen; and displaying, by the display controller, on the display device, the output value change instruction button such that the value of the output level can be input to the text box when the output maintaining instruction button is selected from the execution screen, and causing, by the test executor, the field device to output the simulation signal based on the value of the output level which has been input to the text box.

* * * * *